(12) United States Patent
Lin et al.

(10) Patent No.: US 12,184,167 B2
(45) Date of Patent: Dec. 31, 2024

(54) VOLTAGE BALANCE CIRCUIT

(71) Applicant: Cheng Uei Precision Industry Co., Ltd., New Taipei (TW)

(72) Inventors: Lin Yean Lin, New Taipei (TW); Shih Hsun Tu, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 18/222,083

(22) Filed: Jul. 14, 2023

(65) Prior Publication Data

US 2024/0136923 A1  Apr. 25, 2024
US 2024/0235387 A9  Jul. 11, 2024

Related U.S. Application Data

(60) Provisional application No. 63/417,691, filed on Oct. 20, 2022.

(51) Int. Cl.
*H02M 3/04* (2006.01)

(52) U.S. Cl.
CPC .................................. *H02M 3/04* (2013.01)

(58) Field of Classification Search
None
See application file for complete search history.

(56) References Cited

U.S. PATENT DOCUMENTS

| | | | |
|---|---|---|---|
| 4,860,188 A * | 8/1989 | Bailey | H02J 1/102 307/82 |
| 5,319,536 A | 6/1994 | Malik | |
| 5,745,670 A | 4/1998 | Linde | |
| 6,118,674 A * | 9/2000 | Higashi | H02J 1/108 363/21.01 |
| 6,320,771 B1 * | 11/2001 | Hemena | H02J 1/102 323/272 |

(Continued)

FOREIGN PATENT DOCUMENTS

| | | |
|---|---|---|
| CN | 103299528 A | 9/2013 |
| TW | 538571 B | 6/2003 |

(Continued)

OTHER PUBLICATIONS

Taiwan Patent Office, Office Action, Patent Application No. 112104971, Oct. 5, 2023.

*Primary Examiner* — Jeffrey S Zweizig
(74) *Attorney, Agent, or Firm* — Lin & Associates Intellectual Property, Inc.

(57) ABSTRACT

A voltage balance circuit includes at least two power supply circuits, at least two diodes, a load, at least two voltage dividing circuits and at least two variable resistors. Each power supply circuit has an output end. Each power supply circuit outputs an output voltage. Positive electrodes of the at least two diodes are electrically connected with the output ends of the at least two power supply circuits. Negative electrodes of the at least two diodes are electrically connected with the load. Each voltage dividing circuit has a first resistor and a second resistor. One end of the first resistor and one end of the second resistor of each voltage dividing circuit are connected in series. The other end of the first resistor of each voltage dividing circuit is connected with the output end. Each second resistor is connected with one variable resistor in parallel.

8 Claims, 6 Drawing Sheets

(56) References Cited

U.S. PATENT DOCUMENTS

| | | | |
|---|---|---|---|
| 7,425,779 B2 | 9/2008 | Luo et al. | |
| 7,619,402 B1 * | 11/2009 | Kwong | G05F 1/575 323/369 |
| 7,834,870 B2 * | 11/2010 | Jeong | G09G 3/2927 345/204 |
| 7,911,191 B2 * | 3/2011 | Lewis | G05F 1/46 323/275 |
| 9,046,911 B2 * | 6/2015 | Chang | H03F 3/45475 |
| 9,317,054 B2 * | 4/2016 | Pons | G05F 1/575 |
| 9,461,539 B2 * | 10/2016 | Chern | H02M 3/156 |
| 2005/0110476 A1 | 5/2005 | Mukherjee et al. | |

FOREIGN PATENT DOCUMENTS

| | | |
|---|---|---|
| TW | 201003357 A | 1/2010 |
| TW | 201203769 A | 1/2012 |
| TW | 202201173 A | 1/2022 |
| TW | 202226736 A | 7/2022 |

* cited by examiner

VOLTAGE BALANCE CIRCUIT

CROSS-REFERENCE TO RELATED APPLICATION

The present application is based on, and claims priority from, U.S. Provisional Patent Application No. 63/417,691, filed Oct. 20, 2022, the disclosure of which is hereby incorporated by reference herein in its entirety.

BACKGROUND OF THE INVENTION

1. Field of the Invention

The present invention generally relates to a voltage balance circuit, and more particularly to a voltage balance circuit which adjusts an output voltage of each power supply circuit individually, and the voltage balance circuit ensures that output voltages transmitted to an electrical equipment are close to be consistent.

2. The Related Art

Currently, a function of an existing electronic device becomes more and more powerful, the existing electronic device has more and more power consumption, and demands of supplying electricity are gradually increased. It has become inevitable choices for two power sources or multiple power sources to supply the electricity.

In terms of a conventional circuit which supplies the electricity by the multiple power sources, when external resistance values of a plurality of existing power supply circuits are the same, output voltages of different power supply circuits have errors. Currents in a voltage input end of an electrical equipment are different, so an output power is unbalanced. The unbalanced output power will cause an unnecessary power loss, and a potential safety hazard is existed in a certain extent.

Thus, how to develop to conquer related technologies of the above-mentioned problems is an important issue in this field, it is essential to provide an innovative voltage balance circuit which adjusts an output voltage of each power supply circuit individually, and the voltage balance circuit ensures that output voltages transmitted to an electrical equipment are close to be consistent, so that an output balance is achieved.

SUMMARY OF THE INVENTION

An object of the present invention is to provide a voltage balance circuit which adjusts an output voltage of each power supply circuit individually, and the voltage balance circuit ensures that output voltages transmitted to an electrical equipment are close to be consistent. The voltage balance circuit includes at least two power supply circuits, at least two diodes, a load, at least two voltage dividing circuits and at least two variable resistors. Each power supply circuit has an output end. Each power supply circuit outputs an output voltage via the output end. Positive electrodes of the at least two diodes are electrically connected with the output ends of the at least two power supply circuits. Negative electrodes of the at least two diodes are electrically connected with the load. Each voltage dividing circuit has a first resistor and a second resistor. One end of the first resistor and one end of the second resistor of each voltage dividing circuit are connected in series. The other end of the first resistor of each voltage dividing circuit is connected with the output end of one power supply circuit. Each second resistor is connected with one variable resistor in parallel. Each variable resistor is variable, and then the output voltage of each power supply circuit is adjusted within an allowable voltage range.

Another object of the present invention is to provide a voltage balance circuit. The voltage balance circuit includes at least two power supply circuits, at least two diodes, a load, at least two voltage dividing circuits and at least two variable resistors. Each power supply circuit has an output end. Each power supply circuit outputs an output voltage via the output end. Positive electrodes of the at least two diodes are electrically connected with the output ends of the at least two power supply circuits. Negative electrodes of the at least two diodes are electrically connected with the load. Each voltage dividing circuit has a first resistor and a second resistor. One end of the first resistor and one end of the second resistor of each voltage dividing circuit are connected in series. The other end of the first resistor of each voltage dividing circuit is connected with the output end of one power supply circuit. The other end of the second resistor of each voltage dividing circuit is connected to a ground. The other end of the second resistor of each voltage dividing circuit is connected with one variable resistor in series. Each variable resistor is variable, and then the output voltage of each power supply circuit is adjusted within an allowable voltage range.

Another object of the present invention is to provide a voltage balance circuit. The voltage balance circuit includes two power supply circuits, two diodes, a load, two voltage dividing circuits and two variable resistors. Each power supply circuit has an output end. Each power supply circuit outputs an output voltage via the output end. Positive electrodes of the two diodes are electrically connected with the two output ends of the two power supply circuits. Negative electrodes of the two diodes are electrically connected with the load. Each voltage dividing circuit has a first resistor and a second resistor. One end of the first resistor and one end of the second resistor of each voltage dividing circuit are connected in series. The other end of the first resistor of each voltage dividing circuit is connected with the output end of one power supply circuit. The other end of the second resistor of each voltage dividing circuit is connected to a ground. Each second resistor is connected with one variable resistor in parallel. A tail end of each variable resistor is connected to the ground. Each variable resistor is variable, and then the output voltage of each power supply circuit is adjusted within an allowable voltage range.

As described above, the voltage balance circuit adjusts the output voltage of each power supply circuit individually, the output end of each power supply circuit has the variable resistor. A resistance value of each variable resistor is changed for ensuring that the output voltages of the power supply circuits transmitted to an electrical equipment are close to be consistent, so that an output voltage power difference is caused by the different currents from the power supply circuits, and then an output balance purpose is achieved. As a result, an overall safety and an overall efficiency of a power supply path is improved.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
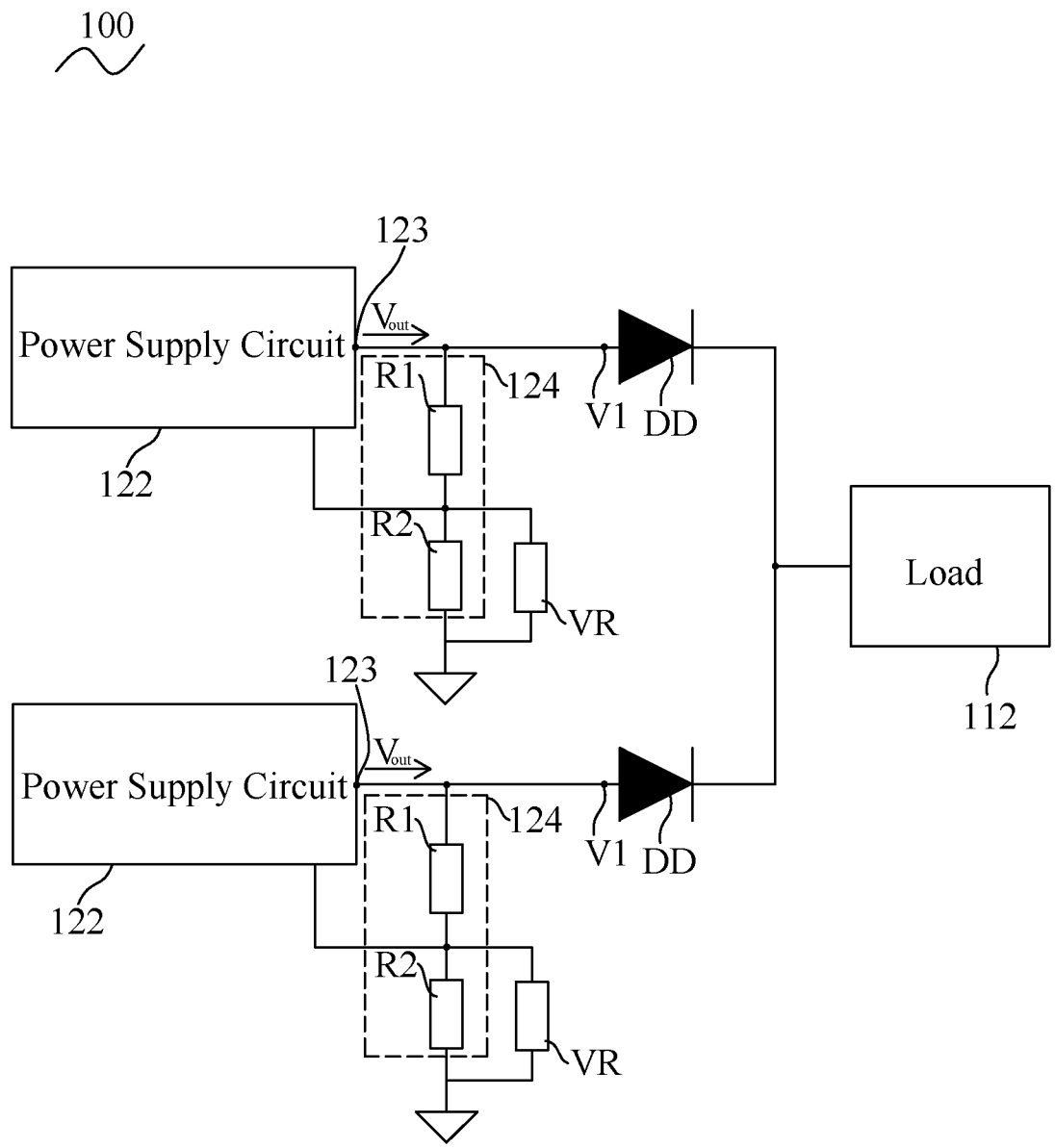
FIG. 1 is a circuit diagram of a voltage balance circuit in accordance with a first preferred embodiment of the present invention.

In this description, when a component is called a connection or a coupling, the connection is able to refer to an electrical connection, or the coupling is able to refer to an electrical coupling. The connection or the coupling is also used for showing a mutual collocation operation or an interaction of two elements or more elements. In addition, although this description uses terms of first, second and so on to describe different components, the terms are only used to distinguish the components or the operations described in the same terms. Unless the context indicates clearly, the terms are without particularly alleging or implying sequences or orders, and the terms are also without being used to limit the present invention.

Here the used terms are only used to describe the purpose of the specific embodiment rather than restrictive. Unless a content of the terms used in the description is indicated clearly, otherwise a singular form of "a", "an" and "the" are designed to include a plural form and "at least one". "Or" shows "and/or". The terms used in the description "and/or" include any and all combinations of one or multiple related items which are listed. The terms should be also understood, when the terms "include" and "contain" are used in the description, the terms indicate specified characteristics, regions, an entirety, steps, operations, and existences of components and/or parts, but the terms are without excluding the one or more other characteristics, the regions, the entirety, the steps, the operations, the existences of the components and the parts, and/or an existence or an addition of a combination of the one or more other characteristics, the regions, the entirety, the steps, the operations, the existences of the components and the parts, when the term "include" or "contain" is used in the description, the terms indicate the specified characteristics, the regions, the entirety, the steps, the operations, and the existences of the components and/or the parts, but the terms are without excluding the one or more other characteristics, the regions, the entirety, the steps, the operations, the existences of the components and the parts, and/or the existence or the addition of the combination of the one or more other characteristics, the regions, the entirety, the steps, the operations, the existences of the components and the parts.

With reference to FIG. 1 to FIG. 6, a voltage balance circuit 100 in accordance with a first preferred embodiment of the present invention is shown. In the present invention, the voltage balance circuit 100 has a load 112, at least two power supply circuits 122, at least two diodes DD, at least two voltage dividing circuits 124 and at least two variable resistors VR.

In the first preferred embodiment, the voltage balance circuit 100 has the load 112, two power supply circuits 122, two diodes DD, two voltage dividing circuits 124 and two variable resistors VR. Each power supply circuit 122 has an output end 123. Each power supply circuit 122 outputs an output voltage $V_{out}$ via the output end 123. Two output ends 123 of the two power supply circuits 122 are electrically connected with the two diodes DD, and then the two diodes DD are connected with the load 112 for providing electric power for the load 112. In a concrete implementation, each power supply circuit 122 is able to be a circuit or an element with a voltage boosting function, a voltage depressing function, a power supplying function or a similar function. Nevertheless, each power supply circuit 122 is without being limited to the circuit or the element with the voltage boosting function, the voltage depressing function, the power supplying function or the similar function.

Referring to FIG. 1, positive electrodes of the at least two diodes DD are electrically connected with the output ends 123 of the at least two power supply circuits 122. Negative electrodes of the at least two diodes DD are electrically connected with the load 112. The positive electrodes of the two diodes DD are connected with the two output ends 123 of the two power supply circuits 122. The negative electrodes of the two diodes DD are connected with the load 112, so that the two power supply circuits 122 output the output voltages $V_{out}$ to the load 112, and a loop between the two power supply circuits 122 and the load 112 is a single direction conduction to prevent a current reflux of each of the different power supply circuits 122. In the first preferred embodiment, following descriptions need be described. A quantity of the power supply circuits 122 is two, a quantity of the diodes DD is two, a quantity of the voltage dividing circuits 124 is two, and a quantity of the variable resistors VR is two for simplifying a circuit diagram of the voltage balance circuit 100 to describe conveniently. The quantity of the power supply circuits 122, the diodes DD, the voltage dividing circuits 124 or the variable resistors VR is without being limited to be two which is shown in FIG. 1.

Referring to FIG. 1 again, the output ends 123 of the power supply circuits 122 of the voltage balance circuit 100 are electrically connected with the voltage dividing circuits 124. Each voltage dividing circuit 124 has a first resistor R1 and a second resistor R2. One end of the first resistor R1 and one end of the second resistor R2 of each voltage dividing circuit 124 are connected in series. The other end of the first resistor R1 of each voltage dividing circuit 124 is connected with the output end 123 of one power supply circuit 122. The other end of the second resistor R2 of each voltage dividing circuit 124 is connected to a ground. A tail end of the second resistor R2 of each voltage dividing circuit 124 is connected to the ground. Each second resistor R2 is connected with one variable resistor VR in parallel, so that the output voltage $V_{out}$ of each power supply circuit 122 is adjusted to an allowable range of a desired voltage. Each variable resistor VR is variable, and then the output voltage $V_{out}$ of each power supply circuit 122 is adjusted within an allowable voltage range.

Figure 2:
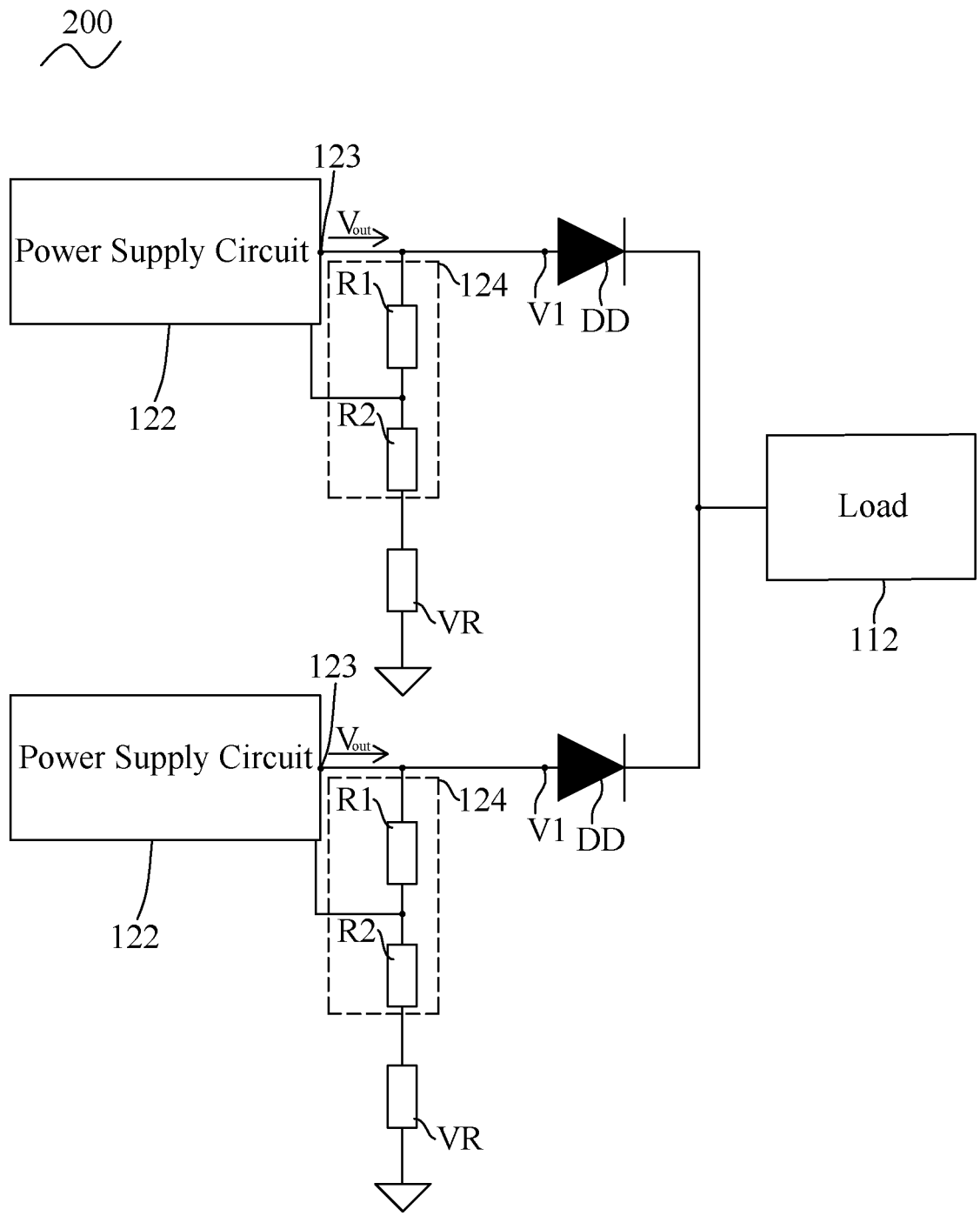
FIG. 2 is a circuit diagram of the voltage balance circuit in accordance with a second preferred embodiment of the present invention.

Referring to FIG. 1 and FIG. 2, a voltage balance circuit 200 in accordance with a second preferred embodiment of the present invention is shown. Differences between the voltage balance circuit 100 in accordance with the first preferred embodiment and the voltage balance circuit 200 in accordance with the second preferred embodiment are described as follows. The one end of each first resistor R1 is connected with the output end 123 of the one power supply circuit 122. A tail end of each variable resistor VR is connected to the ground. The other end of the second resistor R2 of each voltage dividing circuit 124 is connected with the one variable resistor VR in series, so that the output voltage $V_{out}$ of each power supply circuit 122 is adjusted to the allowable range of the desired voltage.

Referring to FIG. 1 and FIG. 2 again, in the first preferred embodiment and in the second preferred embodiment, a voltage balancing process of the output voltage $V_{out}$ of each power supply circuit 122 is described as follows. A desired output voltage of each power supply circuit 122 is 5V. An allowable range of the desired output voltage of each power supply circuit 122 is from (5−5*1%)V to (5+5*1%)V, so the allowable range of the desired output voltage of each power supply circuit 122 is from 4.95V to 5.05V. Users are able to measure a positive electrode voltage V1 of each diode DD. When a gap between the positive electrode voltage V1 of each diode DD and the desired output voltage is overly large, a resistance value of each variable resistor VR is manually adjusted, and then the output voltage $V_{out}$ of each power supply circuit 122 is changed, so that the output voltage $V_{out}$ of each power supply circuit 122 is adjusted within the allowable voltage range. The positive electrode voltage V1 of each diode DD is within the allowable range of the desired output voltage of each power supply circuit 122 which is from 4.95V to 5.05V.

In general, even though external resistance values are the same, the output voltages $V_{out}$ of the power supply circuits 122 still have the errors, output power of the voltage balance circuit 100 causes an imbalance. After the voltage dividing circuit 124 and the variable resistor VR are additionally increased, a gap among the plurality of the output voltages $V_{out}$ of the power supply circuits 122 is lowered to be within 2% to make sure that the output voltages $V_{out}$ of the multiple power supply circuits 122 tend to be the same at the time of leaving a factory. In this way, each voltage dividing circuit 124 and each variable resistor VR prevent a power imbalance caused by a current difference caused by the output end 123 of each power supply circuit 122, and then an output balance effect is achieved.

Figure 3:
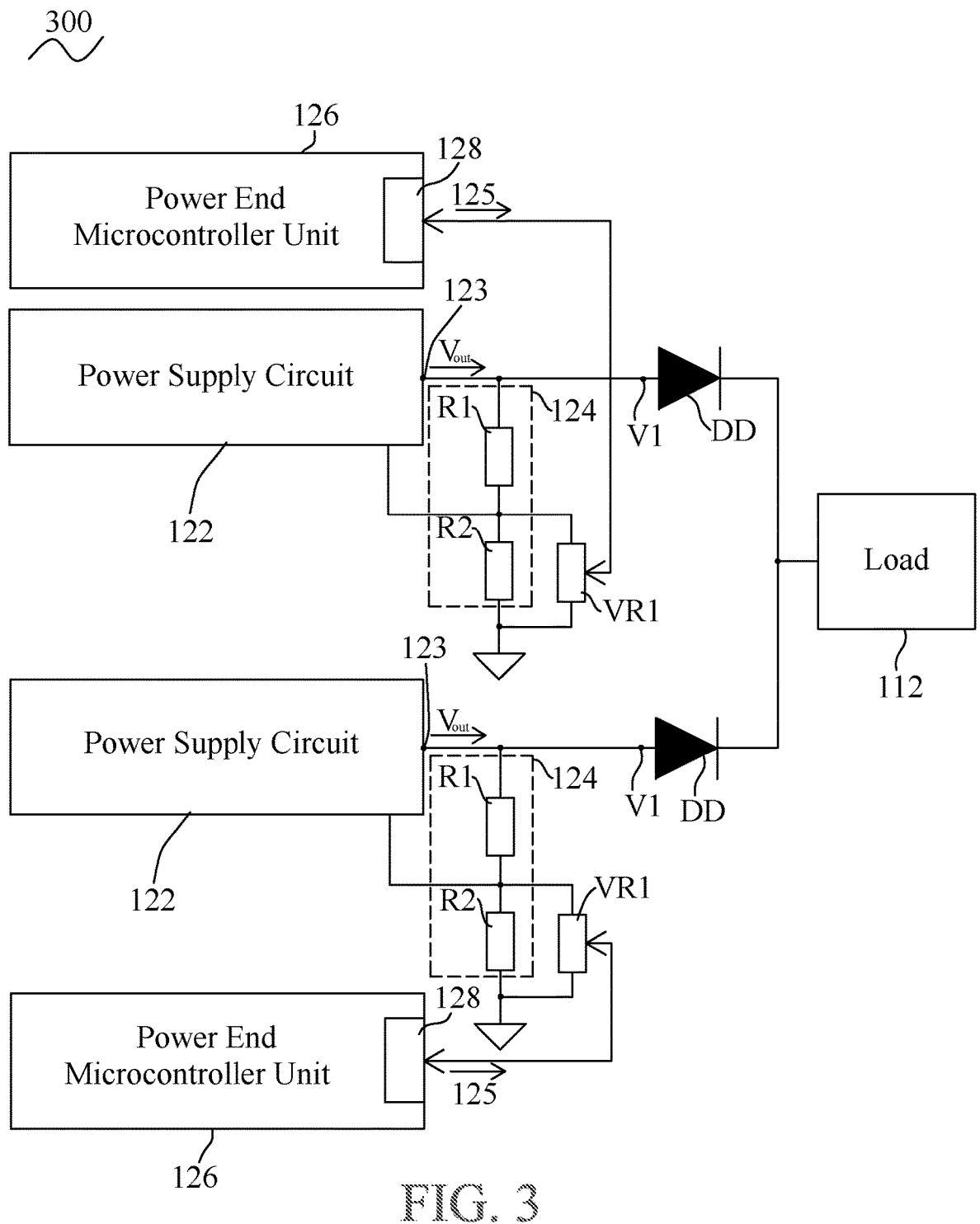
FIG. 3 is a circuit diagram of the voltage balance circuit in accordance with a third preferred embodiment of the present invention.

Referring to FIG. 1 to FIG. 3, a voltage balance circuit 300 in accordance with a third preferred embodiment of the present invention is shown. Differences between the voltage balance circuit 100 in accordance with the first preferred embodiment and the voltage balance circuit 300 in accordance with the third preferred embodiment are described as follows. In the third preferred embodiment, each variable resistor VR is a digital variable resistor VR1. The digital variable resistor VR1 is connected with the other end of one second resistor R2 in series. The digital variable resistor VR1 is connected with the one second resistor R2 in parallel. After a control signal 125 is received, a resistance value of the digital variable resistor VR1 is changed according to the control signal 125. Furthermore, the voltage balance circuit 300 further has at least two power end microcontroller units 126. The voltage balance circuit 300 further has two power end microcontroller units 126. Each power end microcontroller unit 126 has an inter-integrated circuit (I2C) 128. Each power end microcontroller unit 126 is electrically connected to one corresponding digital variable resistor VR1 by virtue of the inter-integrated circuit 128 of each power end microcontroller units 126 being electrically connected with the one corresponding digital variable resistor VR1.

Referring to FIG. 1 to FIG. 4, a voltage balance circuit 400 in accordance with a fourth preferred embodiment of the present invention is shown. Differences between the voltage balance circuit 200 in accordance with the second preferred embodiment and the voltage balance circuit 400 in accordance with the fourth preferred embodiment are described as follows. In the fourth preferred embodiment, each variable resistor VR is the digital variable resistor VR1. After the control signal 125 is received, the resistance value of the digital variable resistor VR1 is changed according to the control signal 125. Furthermore, the voltage balance circuit 400 has two power end microcontroller units 126. Each power end microcontroller unit 126 has the inter-integrated circuit (I2C) 128. Each power end microcontroller unit 126 is electrically connected to the one corresponding digital variable resistor VR1 by virtue of the inter-integrated circuit 128 of each power end microcontroller units 126 being electrically connected with the one corresponding digital variable resistor VR1.

Figure 4:
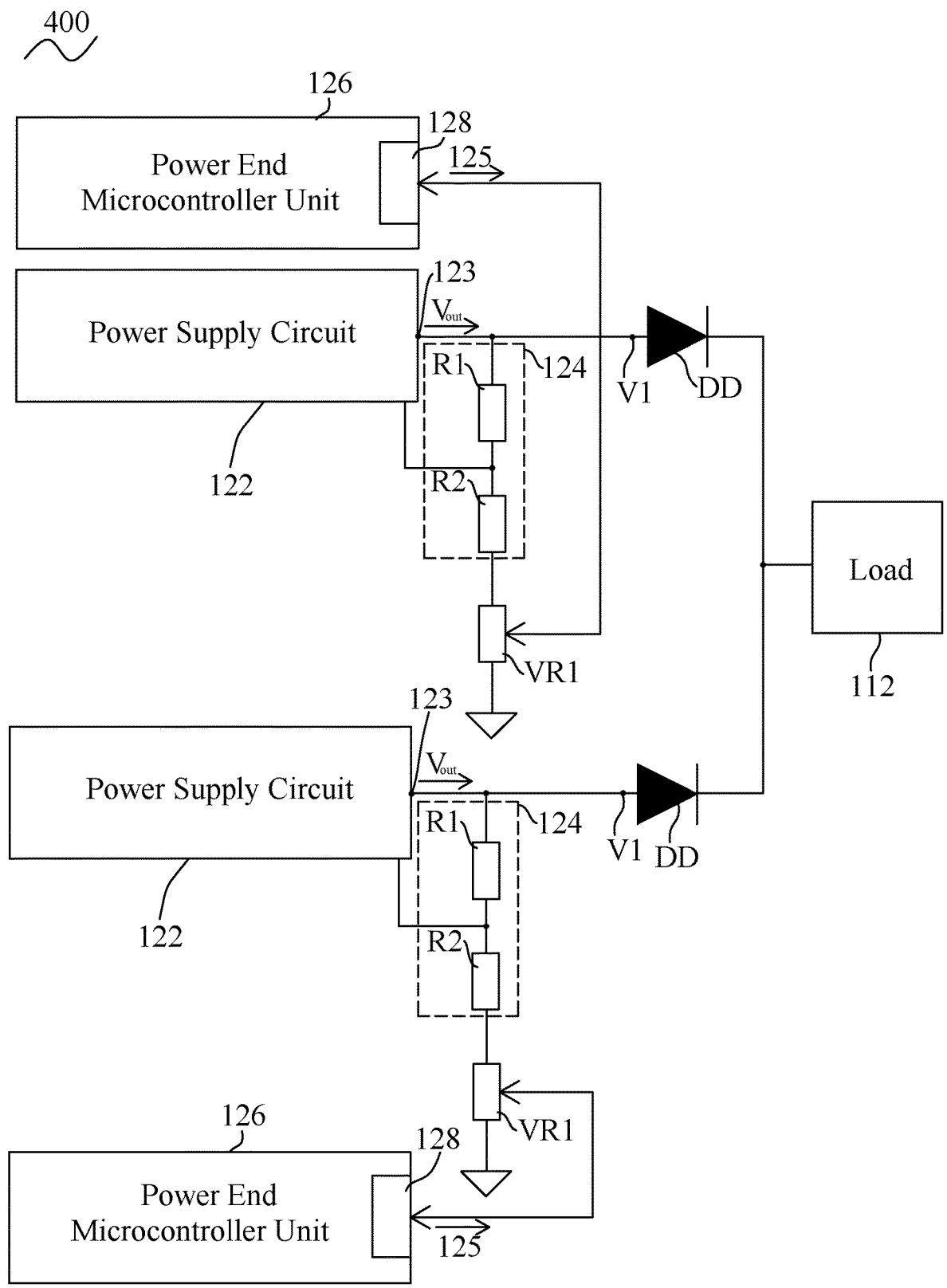
FIG. 4 is a circuit diagram of the voltage balance circuit in accordance with a fourth preferred embodiment of the present invention.

Referring to FIG. 3 and FIG. 4, each power end microcontroller unit 126 is used for reading the resistance value of the one digital variable resistor VR1. Each power end microcontroller unit 126 utilizes the read resistance value of the one digital variable resistor VR1 to calculate a gap between the read resistance value of the one digital variable resistor VR1 and a resistance value which is corresponding to the allowable range of the desired output voltage of each power supply circuit 122. Each power end microcontroller unit 126 reads the resistance value of the one digital variable resistor VR1. Each power end microcontroller unit 126 generates the control signal 125 according to the resistance value of the one digital variable resistor VR1. The control signal 125 includes a gap information between the read resistance value of the one digital variable resistor VR1 and the resistance value which is corresponding to the allowable range of the desired output voltage of each power supply circuit 122. The inter-integrated circuit 128 of each power end microcontroller unit 126 outputs the control signal 125 to the one corresponding digital variable resistor VR1 for adjusting the resistance value of the one corresponding digital variable resistor VR1, so the positive electrode voltage V1 of each diode DD is within the allowable range of the desired output voltage of each power supply circuit 122. The output voltages $V_{out}$ of the power supply circuits 122 tend to be equal. Each power end microcontroller unit 126 controls the one corresponding digital variable resistor VR1 to adjust the resistance value of the one corresponding digital variable resistor VR1 by a circuit configuration, so that an extra error caused by a manual adjustment is prevented. More precisely, the output voltages $V_{out}$ of the power supply circuits 122 tend to be consistent at the time of leaving the factory. Simultaneously, the power imbalance is prevented from being caused by different currents of the power supply circuits 122, and then the output balance effect is achieved.

Referring to FIG. 1 to FIG. 5, a voltage balance circuit 500 in accordance with a fifth preferred embodiment of the present invention is shown. Differences between the voltage balance circuit 300 in accordance with the third preferred embodiment and the voltage balance circuit 500 in accordance with the fifth preferred embodiment are described as follows. The voltage balance circuit 500 further has an input end microcontroller unit 114. The input end microcontroller unit 114 has a universal asynchronous receiver transmitter 118. The input end microcontroller unit 114 is communicated with each power end microcontroller unit 126 by the universal asynchronous receiver transmitter 118. The input end microcontroller unit 114 is connected with each power end microcontroller unit 126 by the universal asynchronous receiver transmitter 118. The input end microcontroller unit 114 is electrically connected with the positive electrode of each diode DD.

Referring to FIG. 1 to FIG. 6, a voltage balance circuit 600 in accordance with a sixth preferred embodiment of the present invention is shown. Differences between the voltage balance circuit 400 in accordance with the fourth preferred embodiment and the voltage balance circuit 600 in accordance with the sixth preferred embodiment are described as follows. The voltage balance circuit 600 further has the input end microcontroller unit 114. The input end microcontroller unit 114 has the universal asynchronous receiver transmitter 118. The input end microcontroller unit 114 is communicated with each power end microcontroller unit 126 by the universal asynchronous receiver transmitter 118. The input end microcontroller unit 114 is connected with each power end microcontroller unit 126 by the universal asynchronous receiver transmitter 118. The input end microcontroller unit 114 is electrically connected with the positive electrode of each diode DD.

Figure 5:
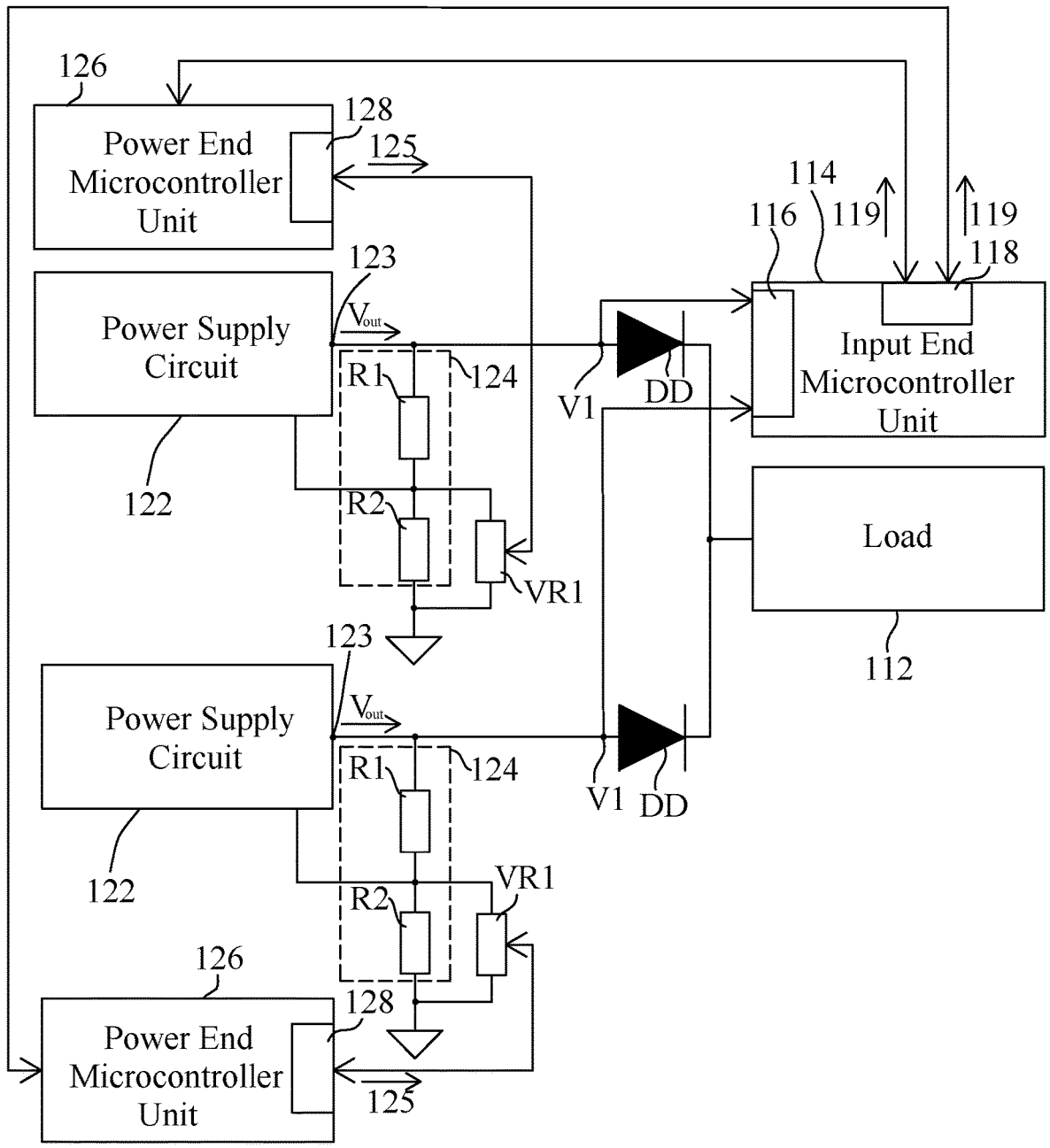
FIG. 5 is a circuit diagram of the voltage balance circuit in accordance with a fifth preferred embodiment of the present invention.
Figure 6:
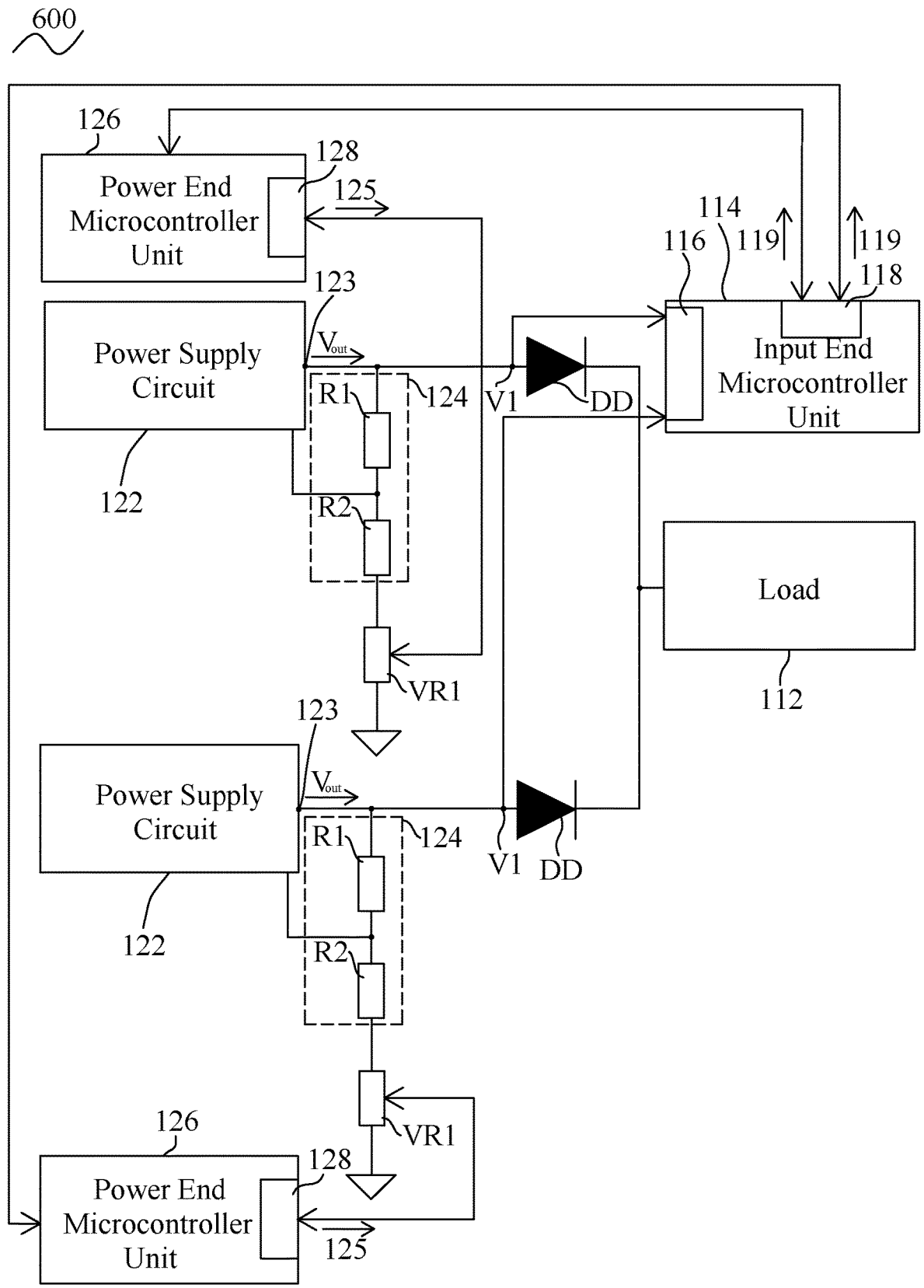
FIG. 6 is a circuit diagram of the voltage balance circuit in accordance with a sixth preferred embodiment of the present invention.

Referring to FIG. 5 and FIG. 6, the input end microcontroller unit 114 is used for measuring the positive electrode voltage V1 of each diode DD. The input end microcontroller unit 114 is based on the positive electrode voltage V1 of each diode DD to form a voltage feedback signal 119, and then the voltage feedback signal 119 is transmitted to each power end microcontroller unit 126 by the universal asynchronous receiver transmitter 118. Each power end microcontroller unit 126 is based on the voltage feedback signal 119 and the read resistance value of the one digital variable resistor VR1 to generate the control signal 125. The control signal 125 is used for adjusting the resistance value of each variable resistor VR. The control signal 125 is used for adjusting the resistance value of each digital variable resistor VR1. The control signal 125 is transmitted to each digital variable resistor VR1 by one power end microcontroller unit 126 to control the resistance value of each digital variable resistor VR1.

Referring to FIG. 5 and FIG. 6 again, specifically, in the fifth preferred embodiment and the sixth preferred embodiment, the input end microcontroller unit 114 has an analog-to-digital (A/D) conversion circuit 116. The input end microcontroller unit 114 acquires a voltage value of the positive electrode voltage V1 of each diode DD by the analog-to-digital (A/D) conversion circuit 116. Next, the input end microcontroller unit 114 compares whether the voltage value of the positive electrode voltage V1 of each diode DD exceeds the allowable range of the desired output voltage of each power supply circuit 122 or not. When the voltage value of the positive electrode voltage V1 of each diode DD exceeds the allowable range of the desired output voltage of each power supply circuit 122, the universal asynchronous receiver transmitter 118 generates the voltage feedback signal 119, and then the voltage feedback signal 119 is sent to each power end microcontroller unit 126 by the universal asynchronous receiver transmitter 118. When each power end microcontroller unit 126 receives the voltage feedback signal 119, each power end microcontroller unit 126 calculates the gap information between the read resistance value of the one digital variable resistor VR1 and the resistance value which is corresponding to the allowable range of the desired output voltage of each power supply circuit 122 by use of voltage information of the voltage feedback signal 119. Each power end microcontroller unit 126 generates the control signal 125. The control signal 125 is outputted to each digital variable resistor VR1 by the inter-integrated circuit 128 of the one power end microcontroller unit 126 to control the resistance value of each digital variable resistor VR1, and then the voltage value of the positive electrode voltage V1 of each diode DD is changed, so that each output voltage $V_{out}$ is within the allowable range of the desired output voltage of each power supply circuit 122.

The output voltages $V_{out}$ of the power supply circuits 122 are promptly ensured to be close to be the same by the circuit configurations of the digital variable resistors VR1 and the voltage feedback signals 119. In the same way, the resistance values of the digital variable resistors VR1 are dynamically adjusted continuously along with the voltage feedback signals 119 so as to more exactly prevent an output power imbalance which is caused by the different currents from the power supply circuits 122, and then the output balance effect is achieved.

In some preferred embodiments, the input end microcontroller unit 114 and the power end microcontroller units 126 are able to be set to a microprogrammed control unit (MCU), other circuits or components with a data access, a data calculation, a data storage, a data transmission, a data reception or similar functions, etc. The input end microcontroller unit 114 and the power end microcontroller units 126 are without being limited to be able to be set to the microprogrammed control unit (MCU), other circuits or components with the data access, the data calculation, the data storage, the data transmission, the data reception or the similar functions, etc.

As described above, the voltage balance circuit 100 adjusts the output voltage $V_{out}$ of each power supply circuit 122 individually, the output end 123 of each power supply circuit 122 has the variable resistor VR. The resistance value of each variable resistor VR is changed for ensuring that the output voltages $V_{out}$ of the power supply circuits 122 transmitted to an electrical equipment are close to be consistent, so that an output voltage power difference is caused by the different currents from the power supply circuits 122, and then an output balance purpose is achieved. As a result, an overall safety and an overall efficiency of a power supply path is improved.

What is claimed is:

1. A voltage balance circuit, comprising:
at least two power supply circuits, each power supply circuit having an output end, each power supply circuit outputting an output voltage via the output end;
at least two diodes, positive electrodes of the at least two diodes being electrically connected with corresponding output ends of the at least two power supply circuits;
a load, negative electrodes of the at least two diodes being electrically connected with the load;
at least two voltage dividing circuits, each voltage dividing circuit having a first resistor and a second resistor connected in series, one end of the first resistor of each voltage dividing circuit being connected with the output end of one corresponding power supply circuit;
at least two digital variable resistors, the second resistor of each voltage dividing circuit being connected with one corresponding digital variable resistor in parallel, the output voltage of the corresponding power supply circuit being adjusted within an allowable voltage range by the corresponding digital variable resistor; and
at least two power end microcontroller units, each power end microcontroller unit having an inter-integrated circuit, being electrically connected to one corresponding digital variable resistor through the inter-integrated circuit and reading a resistance value of the corresponding digital variable resistor;
wherein each power end microcontroller unit generates a control signal according to the resistance value of the corresponding digital variable resistor, and the inter-integrated circuit of each power end microcontroller unit outputs the control signal to the corresponding digital variable resistor for adjusting the resistance value of the corresponding digital variable resistor.

2. The voltage balance circuit as claimed in claim 1, further comprising an input end microcontroller unit, the input end microcontroller unit having a universal asynchronous receiver transmitter, the input end microcontroller unit being communicated with each power end microcontroller unit by the universal asynchronous receiver transmitter, the input end microcontroller unit being electrically connected with the positive electrode of each diode, the input end microcontroller unit being used for measuring a positive electrode voltage of each diode, the input end microcontroller unit being based on the positive electrode voltage of each diode to form a respective voltage feedback signal, and then the respective voltage feedback signal being transmitted to one corresponding power end microcontroller unit by the universal asynchronous receiver transmitter, each power end microcontroller unit being based on the respective voltage feedback signal and the read resistance value of the corresponding digital variable resistor to generate the control signal, the control signal being transmitted to the corresponding digital variable resistor to control the resistance value of the corresponding digital variable resistor.

3. A voltage balance circuit, comprising:
at least two power supply circuits, each power supply circuit having an output end, each power supply circuit outputting an output voltage via the output end;
at least two diodes, positive electrodes of the at least two diodes being electrically connected with corresponding output ends of the at least two power supply circuits;
a load, negative electrodes of the at least two diodes being electrically connected with the load;
at least two voltage dividing circuits, each voltage dividing circuit having a first resistor and a second resistor connected in series, one end of the first resistor of each voltage dividing circuit being connected with the output end of one corresponding power supply circuit;
at least two digital variable resistors, the second resistor of each voltage dividing circuit being connected with one corresponding digital variable resistor in series, the output voltage of the corresponding power supply circuit being adjusted within an allowable voltage range by the corresponding digital variable resistor; and
at least two power end microcontroller units, each power end microcontroller unit having an inter-integrated circuit, being electrically connected to one corresponding digital variable resistor through the inter-integrated circuit and reading a resistance value of the corresponding digital variable resistor;
wherein each power end microcontroller unit generates a control signal according to the resistance value of the corresponding digital variable resistor, and the inter-integrated circuit of each power end microcontroller unit outputs the control signal to the corresponding digital variable resistor for adjusting the resistance value of the corresponding digital variable resistor.

4. The voltage balance circuit as claimed in claim 3, further comprising an input end microcontroller unit, the input end microcontroller unit having a universal asynchronous receiver transmitter, the input end microcontroller unit being communicated with each power end microcontroller unit by the universal asynchronous receiver transmitter, the input end microcontroller unit being electrically connected with the positive electrode of each diode, the input end microcontroller unit being used for measuring a positive electrode voltage of each diode, the input end microcontroller unit being based on the positive electrode voltage of each diode to form a respective voltage feedback signal, and then the respective voltage feedback signal being transmitted to one corresponding power end microcontroller unit by the universal asynchronous receiver transmitter, each power end microcontroller unit being based on the respective voltage feedback signal and the read resistance value of the corresponding digital variable resistor to generate the control signal, the control signal being transmitted to the corresponding digital variable resistor to control the resistance value of the corresponding digital variable resistor.

5. A voltage balance circuit, comprising:
two power supply circuits, each power supply circuit having an output end, each power supply circuit outputting an output voltage via the output end;
two diodes, positive electrodes of the two diodes being electrically connected with corresponding output ends of the two power supply circuits;
a load, negative electrodes of the two diodes being electrically connected with the load;
two voltage dividing circuits, each voltage dividing circuit having a first resistor and a second resistor connected in series, one end of the first resistor of each voltage dividing circuit being connected with the output end of one corresponding power supply circuit;
two digital variable resistors, the second resistor of each voltage dividing circuit being connected with one corresponding digital variable resistor, the output voltage of the corresponding power supply circuit being adjusted within an allowable voltage range by the corresponding digital variable resistor; and
two power end microcontroller units, each power end microcontroller unit having an inter-integrated circuit, being electrically connected to one corresponding digital variable resistor through the inter-integrated circuit and reading a resistance value of the corresponding digital variable resistor;
wherein each power end microcontroller unit generates a control signal according to the resistance value of the corresponding digital variable resistor, and the inter-integrated circuit of each power end microcontroller unit outputs the control signal to the corresponding digital variable resistor for adjusting the resistance value of the corresponding digital variable resistor.

6. The voltage balance circuit as claimed in claim 5, further comprising an input end microcontroller unit, the input end microcontroller unit having a universal asynchronous receiver transmitter, the input end microcontroller unit being communicated with each power end microcontroller unit by the universal asynchronous receiver transmitter, the input end microcontroller unit being electrically connected with the positive electrode of each diode, the input end microcontroller unit being used for measuring a positive electrode voltage of each diode, the input end microcontroller unit being based on the positive electrode voltage of each diode to form a respective voltage feedback signal, and then the respective voltage feedback signal being transmitted to one corresponding power end microcontroller unit by the universal asynchronous receiver transmitter, each power end microcontroller unit being based on the respective voltage feedback signal and the read resistance value of the corresponding digital variable resistor to generate the control signal, the control signal being transmitted to the corresponding digital variable resistor to control the resistance value of the corresponding digital variable resistor.

7. The voltage balance circuit as claimed in claim 5, wherein the corresponding digital variable resistor is connected with the second resistor in series.

8. The voltage balance circuit as claimed in claim 5, wherein the corresponding digital variable resistor is connected with the second resistor in parallel.

* * * * *